(12) United States Patent
Lawrence et al.

(10) Patent No.: US 11,950,749 B2
(45) Date of Patent: Apr. 9, 2024

(54) VACUUM CLEANER FILTER CARTRIDGE

(71) Applicant: Numatic International LTD, Camberley (GB)

(72) Inventors: Ian Lawrence, Somerset (GB); Marcus Aston, Somerset (GB); James Forrest, Somerset (GB); Ian Bevis, Somerset (GB)

(73) Assignee: Numatic International Limited (GB)

( * ) Notice: Subject to any disclaimer, the term of this patent is extended or adjusted under 35 U.S.C. 154(b) by 183 days.

(21) Appl. No.: 17/435,341

(22) PCT Filed: Mar. 3, 2020

(86) PCT No.: PCT/GB2020/050504
§ 371 (c)(1),
(2) Date: Aug. 31, 2021

(87) PCT Pub. No.: WO2020/178573
PCT Pub. Date: Sep. 10, 2020

(65) Prior Publication Data
US 2022/0133107 A1 May 5, 2022

(30) Foreign Application Priority Data
Mar. 4, 2019 (GB) ..................................... 1902895

(51) Int. Cl.
*B01D 53/22* (2006.01)
*A47L 9/12* (2006.01)
(Continued)

(52) U.S. Cl.
CPC ............. *A47L 9/127* (2013.01); *A47L 9/1436* (2013.01); *B01D 46/02* (2013.01);
(Continued)

(58) Field of Classification Search
CPC ............ B01D 46/4272; B01D 2279/55; B01D 2265/06; B01D 46/02; B01D 2275/203;
(Continued)

(56) References Cited

U.S. PATENT DOCUMENTS 2,564,339 A    8/1951   Nerheim
3,627,115 A *  12/1971  Samalon .............. B65D 75/004
                                                      229/87.18

(Continued)

FOREIGN PATENT DOCUMENTS

CN           1295448          1/2007
CN         101531265 A         9/2009
(Continued)

OTHER PUBLICATIONS

American Heritage Dictionary of the English Language, Fifth Edition. 2016 by Houghton Mifflin Harcourt Publishing Company. 1 page https://www.thefreedictionary.com/cartridge (Year: 2016).*

(Continued)

*Primary Examiner* — Anthony R Shumate
(74) *Attorney, Agent, or Firm* — Dorsey & Whitney LLP

(57) ABSTRACT

The present invention relates to the field of machines for cleaning, particularly vacuum cleaning devices. There is disclosed a filter cartridge for a vacuum cleaner comprising first and second opposite end walls, a side wall or walls which extend between the end walls so as to define an enclosure which surrounds a filter interior, wherein one or more of the walls comprises filter membrane material, the cartridge having an opening provided through the first end wall for receiving air-entrained detritus into the interior, the opening being defined by a rigid support structure which spans and supports the first end wall of the cartridge. The cartridge typically includes a non-return valve which closes when suction is removed so as to help prevent collected (Continued)

A1 detritus escaping from the filter cartridge interior. The valve may comprise a conical valve with flexible facets, or a cantilever flap.

11 Claims, 17 Drawing Sheets

(51) Int. Cl.
    *A47L 9/14*                 (2006.01)
    *B01D 46/02*              (2006.01)
    *B01D 46/42*              (2006.01)
    *B01D 46/54*              (2006.01)
    *F16K 15/14*              (2006.01)

(52) U.S. Cl.
    CPC ....... *B01D 46/4272* (2013.01); *B01D 46/543* (2013.01); *F16K 15/145* (2013.01); *B01D 2265/04* (2013.01); *B01D 2265/06* (2013.01); *B01D 2271/02* (2013.01); *B01D 2275/203* (2013.01); *B01D 2279/55* (2013.01)

(58) Field of Classification Search
    CPC ............ B01D 2271/02; B01D 2265/04; B01D 46/543; A47L 9/127; A47L 9/1436; F16K 15/145
    See application file for complete search history.

(56) References Cited

U.S. PATENT DOCUMENTS

| | | |
|---|---|---|
| 5,297,311 A | 3/1994 | Puri |
| 5,855,634 A | 1/1999 | Berfield |
| 8,038,880 B2 * | 10/2011 | Mues ................... B01D 65/003 210/601 |
| 2004/0098957 A1 | 5/2004 | Yoo et al. |
| 2006/0015136 A1 * | 1/2006 | Besselink ................ A61F 2/01 606/200 |
| 2007/0207186 A1 * | 9/2007 | Scanlon ................. B29C 55/26 623/1.42 |
| 2008/0127832 A1 | 6/2008 | Zhang |
| 2008/0148511 A1 * | 6/2008 | Brown .................. A47L 9/1454 15/339 |
| 2009/0260179 A1 | 10/2009 | Walker |
| 2011/0220566 A1 * | 9/2011 | Kreiner ............... B29C 45/1642 156/196 |
| 2014/0083873 A1 * | 3/2014 | Capitani ............ B65D 85/8061 206/0.5 |
| 2019/0200827 A1 | 7/2019 | Crouch et al. |
| 2019/0291027 A1 * | 9/2019 | Leblanc ................. B01D 27/06 |
| 2021/0023510 A1 * | 1/2021 | Ishii ....................... B01D 71/22 |
| 2021/0086139 A1 * | 3/2021 | Ishii ................... B01D 67/0088 |
| 2021/0260538 A1 * | 8/2021 | Ikeyama ................ B01D 69/02 |
| 2021/0370238 A1 * | 12/2021 | Ishii ....................... B01D 71/68 |
| 2022/0151449 A1 * | 5/2022 | Lawrence ............ B01D 46/543 |

FOREIGN PATENT DOCUMENTS

| | | |
|---|---|---|
| EP | 2730912 | 11/2013 |
| JP | 2007114513 | 5/2007 |
| JP | 2010125052 | 6/2010 |
| KR | 1020040043384 | 5/2004 |
| KR | 1020080044782 | 5/2021 |

OTHER PUBLICATIONS

International Search Report and Publication dated May 12, 2020 for PCT/GB2020/050503.

* cited by examiner

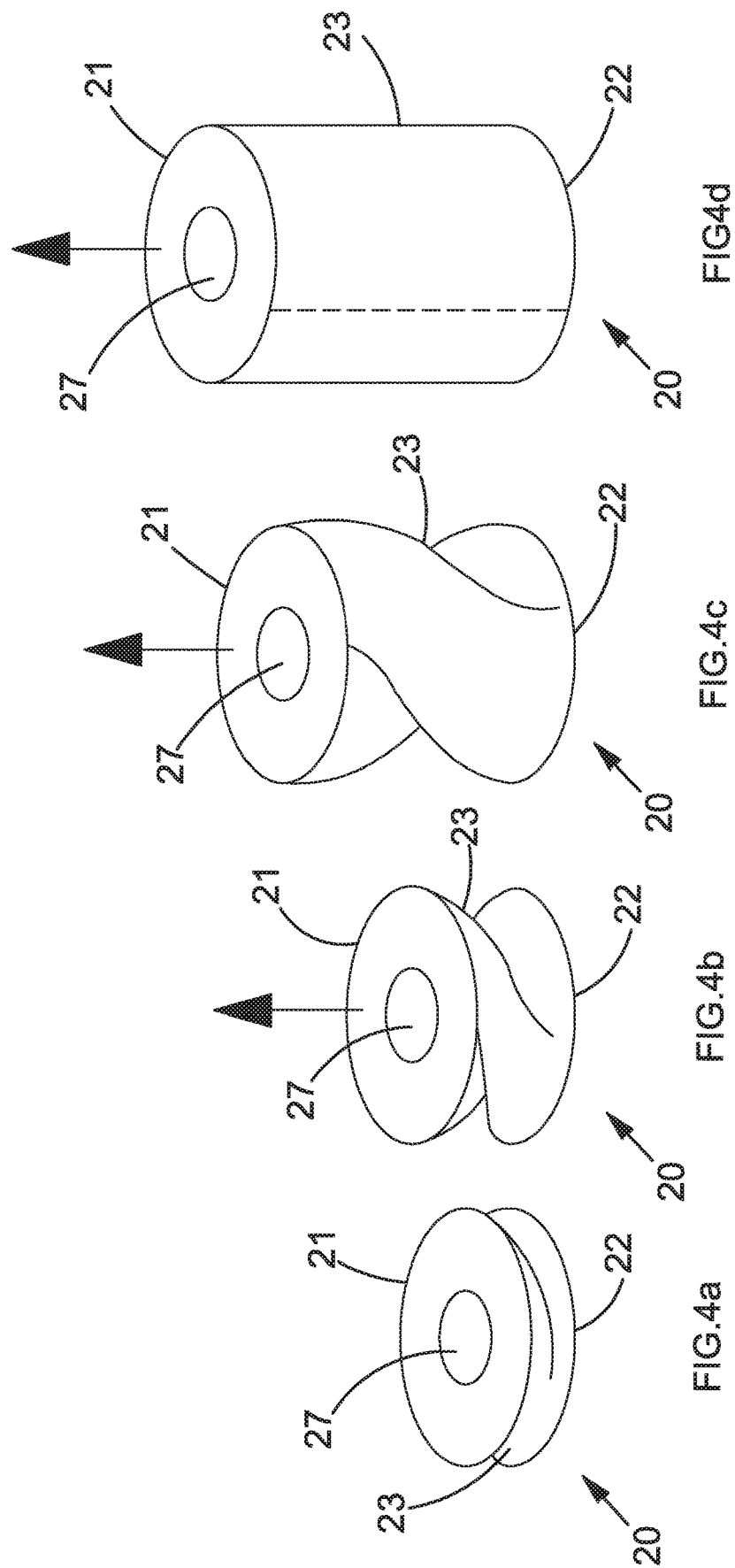

VACUUM CLEANER FILTER CARTRIDGE

The present invention relates to the field of machines for cleaning, particularly vacuum cleaning devices. Typical machines include upright vacuum cleaners or canister/cylinder vacuum cleaners which have a wand or tube portion provided with a work head for cleaning various surfaces. In these machines, a vacuum is created within a main body which provides a form of suction that collects dust and other small particles. In particular the invention relates to a filter cartridge for use in a vacuum cleaner, which may be collapsible to permit storage before use in a generally flat configuration.

In conventional vacuum cleaner use, the filter bag can be difficult to orientate and fit into the vacuum cleaner. The bags must locate on at least one feature, which usually requires two hands to position. Removal of the filter bag is usually by hand, requiring the user to touch the bag during removal. Alternative vacuum cleaners operate using a bagless system, wherein the dust is contained within the vacuum cleaner without the use of a separate bag. In these types of vacuum cleaner, hair and long fibres can become entangled within the machine and require removal by hand or tool. Bagless vacuum cleaners often produce a dust "cloud" when being emptied.

There are a number of problems that arise during use of conventional filter bags, as described above. The present invention seeks to provide a filter cartridge for use in vacuum cleaners, which can be easily inserted into the vacuum cleaner and removed from the vacuum cleaner with minimal input from the user. The invention also seeks to provide a filter cartridge which minimize the escape of dust during unloading from the vacuum cleaning machine.

Some or all of these aims (and others that will be evident to the skilled person) are met by the present invention in its various aspects, as will be evident from the following description.

According to one aspect of the invention there is provided a filter cartridge comprising first and second opposite end walls, a side wall or walls which extend between the end walls so as to define an enclosure which surrounds a filter interior, wherein one or more of the walls comprises filter membrane material.

The filter cartridge may have an opening provided through the first end wall for receiving air-entrained detritus into the interior, the opening being defined by a rigid support structure which spans and supports the first end wall of the cartridge.

By rigid we mean that it provided enough rigidity to support the filter cartridge shape without collapsing under its own weight or due to an applied vacuum suction. The filter membrane material may be a single layer, or multilayer of filter material. This material is typically flexible, by which we mean flexible enough to be collapsed flat when handled. The filter cartridge may be collapsible, which is to say one in which the body of the cartridge which defines the interior volume may be collapsed flat onto the rigid support structure. The filter membrane material or web is generally planar, and does not rely upon repeated pleats or folds to prevent buckling or increase surface area.

The filter membrane material of the filter cartridge may provide the side wall or walls of the cartridge. The filter membrane material of the filter cartridge may provide the second end wall of the cartridge.

In another aspect of the invention, structural reinforcement may be provided on or more of the sidewall or walls, and/or second end wall of the filter cartridge, so that the filter cartridge enclosure is self-supporting but collapsible, so that the cartridge may adopt an erect use configuration and in a collapsed configuration the side wall or walls and second end of the filter cartridge are drawn together onto the rigid support structure of the first end so as to be flat-packed.

The structural reinforcement of the filter cartridge may act to bias the cartridge into the erect configuration, so that a collapsed cartridge will spontaneously adopt the erect configuration when a collapsing constraint is released.

The filter cartridge may have a generally cylindrical configuration. The first and second end walls may have a generally disc-shaped configuration. A cylindrical side wall may extend between the first and second ends of the filter cartridge.

The structural reinforcement of the filter cartridge may comprise one or more elongate seams joining filter membrane material portions. The seam may comprise overlapped, or pinched together, or butted together portions of filter membrane material. The portions of material may be joined by welding, such as ultrasonic welding, or fusion welding, or by adhesive such as hot melt adhesive.

The structural reinforcement of the filter bag may comprise one or more resiliently flexible elongate struts, such as wire or plastic spines, which struts when elastically deformed during collapse may provide the erection bias.

One or more of the seams of the filter cartridge may extend in the sidewall in an axial direction between the end walls. Alternatively, or in addition, the seams may extend helically around and along the sidewall between end walls.

One or more strut may be integrated into one or more seam of the filter bag. Alternatively, one or more strut may be attached to the sidewall filter membrane material of the filter cartridge.

The rigid support structure of the first end wall of the filter cartridge may comprise a central inner collar which defines the filter opening. There may also be an annular outer rim which defines a perimeter of the first end wall. The collar and rim portions of the rigid structure of the first end wall of the filter cartridge may be structurally attached/integrated as a unitary member. For example, the rigid support structure may be provided by a spider member with multiple spokes or arms which provide a connecting means between the collar and the rim portions of the rigid support structure.

Alternatively the rigid support structure may comprise a generally annular member formed with a central bore defined by a collar. The member may have an inner dished (e.g. frustoconical) portion which is convex away from the cartridge interior. The member may have an outer dished portion (e.g frustoconical) which is concave so that the inner dished portion is inset back into the cartridge. The collar may be coterminous with a rim of the body portion of the filter.

In a further aspect of the invention there is provided a filter cartridge as hereinbefore described wherein a non-return valve is provided in the filter opening.

By non-return valve we mean that the valve allows fluid (gas) to be drawn through the filter opening into the filter cartridge, but which prevents (or limits) flow of matter (gas or collected detritus) back out through the opening.

The non-return valve may be provided with resilient constraint means which is adapted to adopt an open configuration in response to a threshold reduced pressure in the filter cartridge interior, and which closes, or substantially closes, when the pressure reverts to ambient.

In one arrangement the non-return valve comprises a generally conical membrane which points towards the cartridge interior, preferably coaxially aligned. In this case the conical membrane may comprise faceted flaps of resilient web material. The flaps may be adapted to flex away from the apex of the membrane when open and return to meet at the apex when closed.

In another arrangement the non-return valve comprises a flap of material which can deflect between a closed position in which the flap blocks the filter opening and an open position in which the flap is deflected away from the open position and into the filter interior. Preferably there is a single flap of material. The flap may be made of sheet plastics material, such as polypropylene, PVC, polyester or another similar resilient polymer material. The flap is preferably oriented so that in the closed position the flap is generally transverse with respect to the longitudinal axis of the filter cartridge, which axis extends between the end caps thereof.

In deflecting between closed and open positions, the flap may have an edge region which is fixed and a body portion which articulates or pivots with respect to the edge region. The pivot may be provided by an elongate seam or weakness (e.g. locally thinned neck region). Alternatively, or in addition, the body portion of the flap may be sufficiently flexible to bend along its length in response to inward airflow into the cartridge.

The edge region which may be fixed to a portion of a collar which defines the filter opening. Thus the flap may cantilever from the said collar portion to obturate the opening when undeflected. The flap typically comprises a planar web of flexible plastics material.

Deflection-limiting stop or stops may be provided to limit the inward deflection of the flap or flaps.

A shroud may be provided around the filter opening, projecting inwardly into the filter interior from the collar which defines the opening. The shroud may have a generally horseshoe shape.

The flap stop or stops may comprise one or more radially projecting nubs directed inwardly from the shroud inner surface. There may be two said nubs arranged to be diametrically opposed to one another.

The filter cartridge may be provided with an annular flange around the outer circumference of the support structure. The rigid support structure is preferably generally annular in form.

The support structure may be provided with a circumferential outer annular flange which renders the filter cartridge capable of being clamped between a rim and a lid of a vacuum chamber in which the filter cartridge may be located.

The material for the cone facets or flap member material may comprise a transparent material. This allows a visual inspection to indicate whether the filter is full, even when the valve is closed.

The rigid support structure of the filter cartridge may be provided with one or more seals operative between the filter cartridge opening and an inlet port of a vacuum chamber in which the cartridge is accommodated when in use. An inner seal may be provided at the inner collar region of the filter cartridge opening of the rigid support structure.

The rigid support structure of the filter cartridge may be generally disc shaped and provided with a circumferential outer seal operative between the first end of the cartridge an internal wall of a cylindrical vacuum chamber in which the filter cartridge is accommodated when in use. The circumferential outer seal may be provided on an end face of the annular rim of the rigid support structure.

Following is a description by way of example only and with reference to the accompanying drawings of various modes for putting the present invention into effect.

In the drawings:

FIG. 2b is a side on cross sectional view from section A-A of FIG. 2a.

FIGS. 4a to 4d are a series of side perspective views showing lengthening of the filter cartridge as it returns from its collapsed configuration to its expanded configuration.

FIRST EMBODIMENT

Figure 1A:
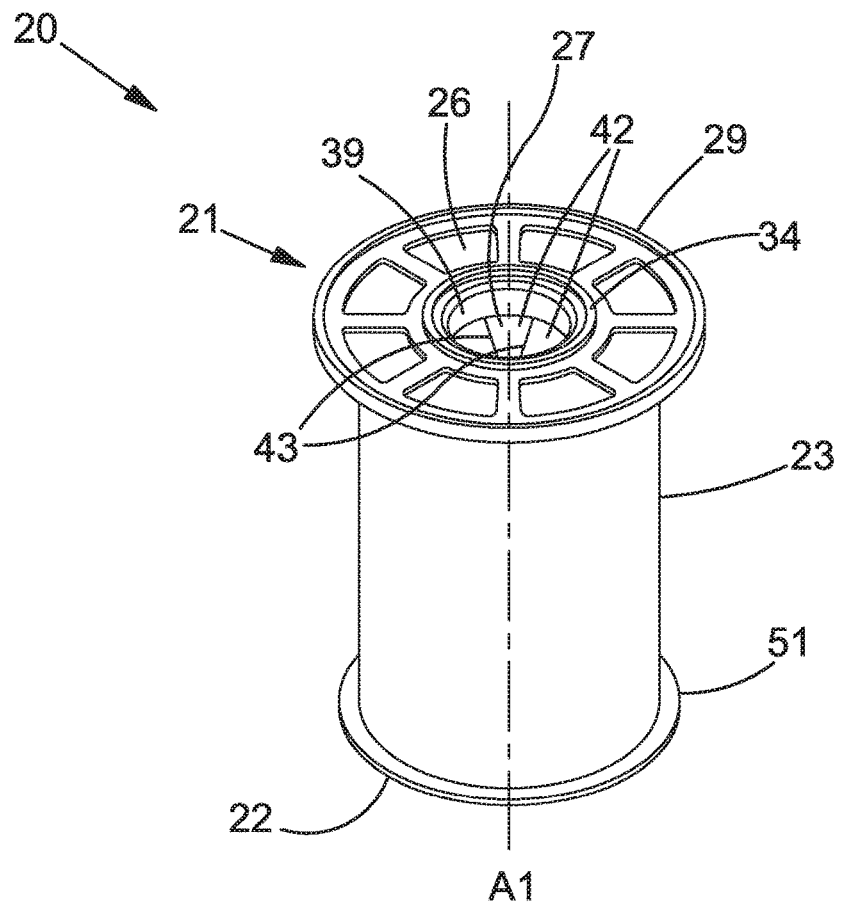
FIG. 1a is a front perspective view showing a filter cartridge in accordance with a first embodiment of the invention.
Figure 1B:
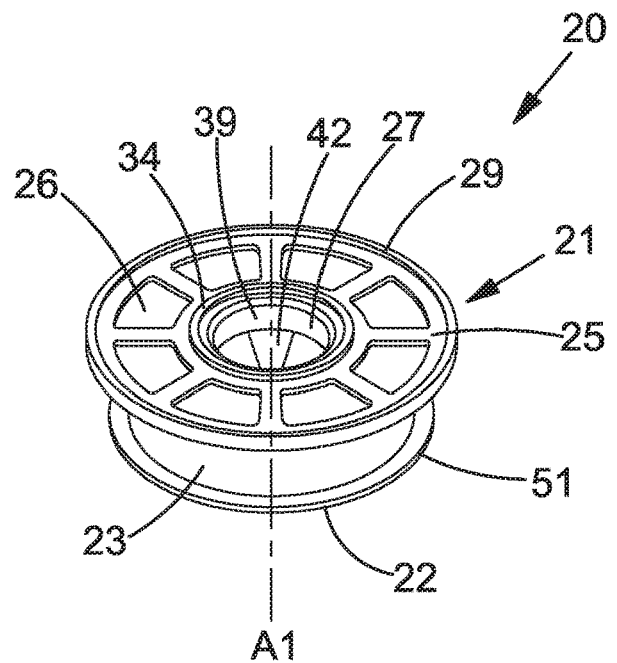
FIG. 1b is a front perspective view showing the filter cartridge in a collapsed configuration.

In FIG. 1a, a filter cartridge in accordance with the present invention is shown generally as 20. The filter cartridge comprises a first end portion 21, a second end portion 22 and a body portion 23. The first end portion 21 comprises a spider member 25, having eight cut out segments 26, a central opening 27 and a non-return valve 28 best seen in FIG. 2b. The spider member 25 of the first end portion 21 has an outer annular seal 29 having a C-section. The seal extends circumferentially about the central axis A1 of the disc shaped main body 25. The seal 29 is mounted onto an outer circumferential edge region 32 of the spider member 25 as shown in FIG. 2c. The seal 29 thereby provides an annular upper lip 31 and a corresponding lower annular lip 33 which protrudes from the underside of the spider member 25 as shown in FIG. 2c.

Figure 9:
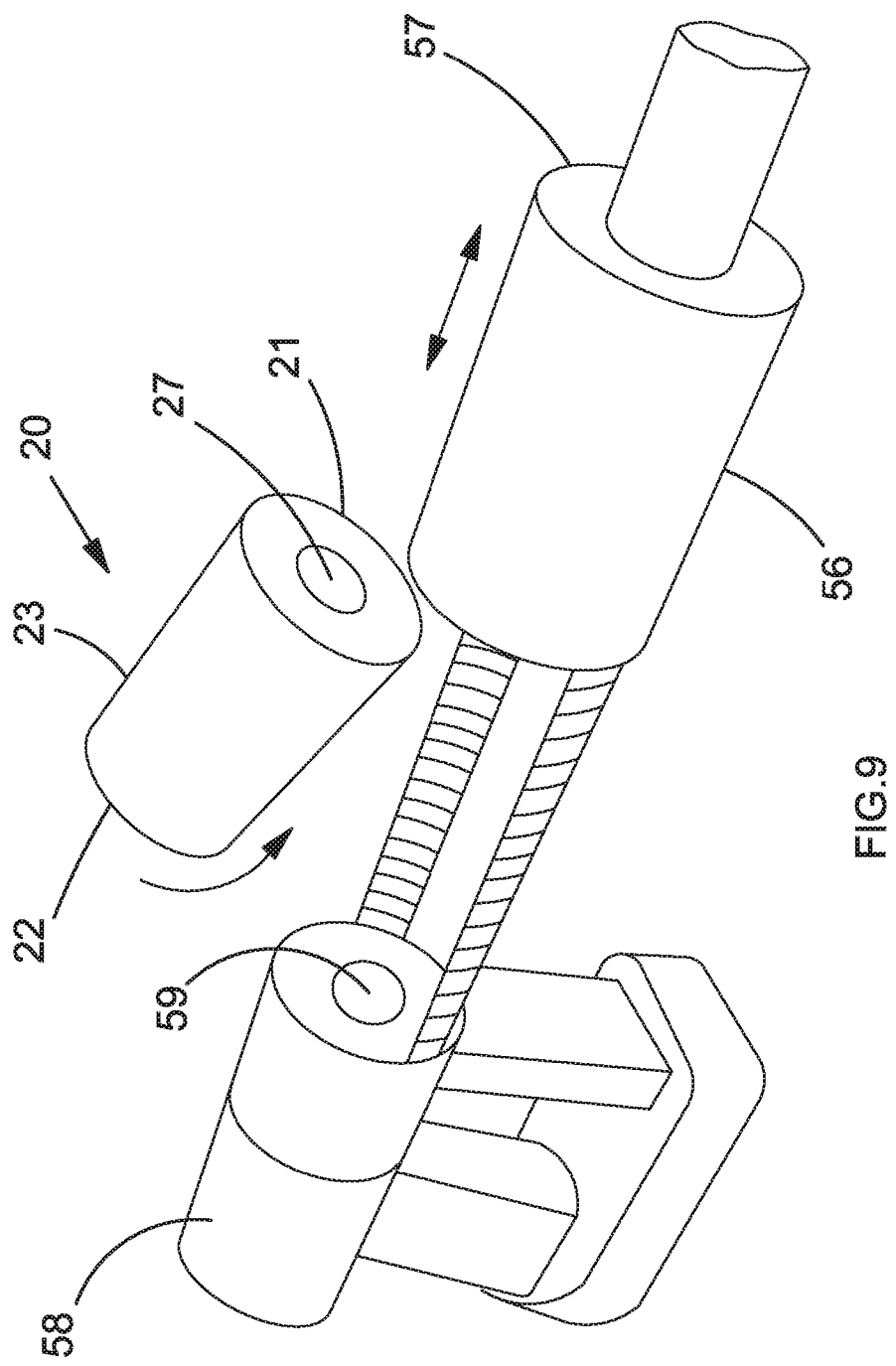
FIG. 9 is a schematic three-quarter perspective view showing a filter cartridge in accordance with the invention being fitted into a vacuum cleaner having top-loading access.

A further annular seal 34 is provided around the opening 27 in the spider member (as shown in FIG. 1a). The seal bead defines a rectangular sectioned lip 35 about the central axis A1 of the spider member 25. The protruding lips 31, 35 of the outer seal 29 and inner seal 34 provide a fluid seal when the filter is accommodated in the vacuum chamber of a vacuum cleaner (as shown in FIG. 9 fore example) so that the suction air flow containing dust and small particles is directed into the filter cartridge 20 through the central opening 27 of the spider member 25.

The central opening 27 of the spider member 25 provides an entry point for the dust and small particles drawn into the filter cartridge 20 by the vacuum cleaner during use. The opening 27 is defined by an annular collar 36. The collar extends from a bottom face 37 of the spider member 25 downwards into the main body 23 of the filter cartridge 20. Said collar assists in channeling the air flow into the filter cartridge 20 and provides a connecting face 38 for attachment of the non-return valve 28 to attach, as will be explained below. The connecting face 38 is the outer cylindrical face of the annular collar 36.

The non-return valve 28 is a unitary moulded plastics member having a generally conical form and an annular collar 39. The collar 39 comprises an inner face 40 which is fixed (for example by adhesive) to the outer face 38 of the annular collar 36. The conical portion 41 depends from the annular collar 39 of the non-return valve 28. The conical portion is divided into a plurality of triangular segments 42 by radial slits 43 cut into the conical portion from the apex 44 of the conical portion to the collar.

The non-return valve 28 is made from a polymer material which is flexibly resilient. Thus the triangular segments 42 may each splay outwardly to an open configuration to form an orifice, in response to reduced pressure cause by a suction drive of the vacuum cleaner in which the filter cartridge is placed. Thus air-entrained detritus may be drawn into the filter interior through the non-return valve. Once the suction is stopped, the segments flex back to the conical closed configuration. In this configuration the valve is closed so that escape of collected detritus is prevent or at least limited.

The underside 37 of spider member 25 has adhered thereto an annular web of filter material 45. Said filter material has a central hole of diameter D (FIG. 2c). The outer diameter D5 of the filter material 45 is greater than the outside diameter D6 of the cut-out segments D7 in the spider member 25. The aforementioned sizing allows the filter material 45 cover the segments gaps 26.

The body portion 23 of the filter cartridge is a web of flexible porous material. The body has a flared upper annular shoulder 47 which is fixed to the outer underside region of the annular web 45, typically by use of adhesive or welding.

Figure 2A:
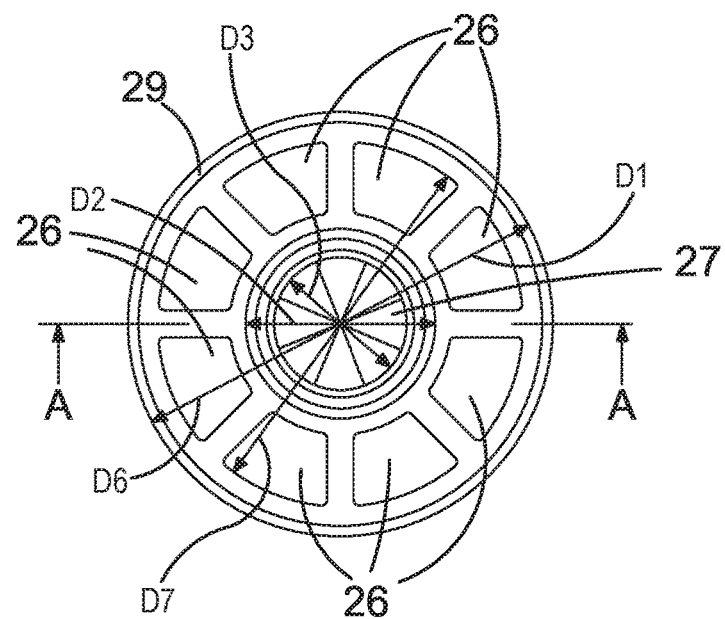
FIG. 2a is a plan view showing the first (inlet) end of the filter cartridge.
Figure 2B:
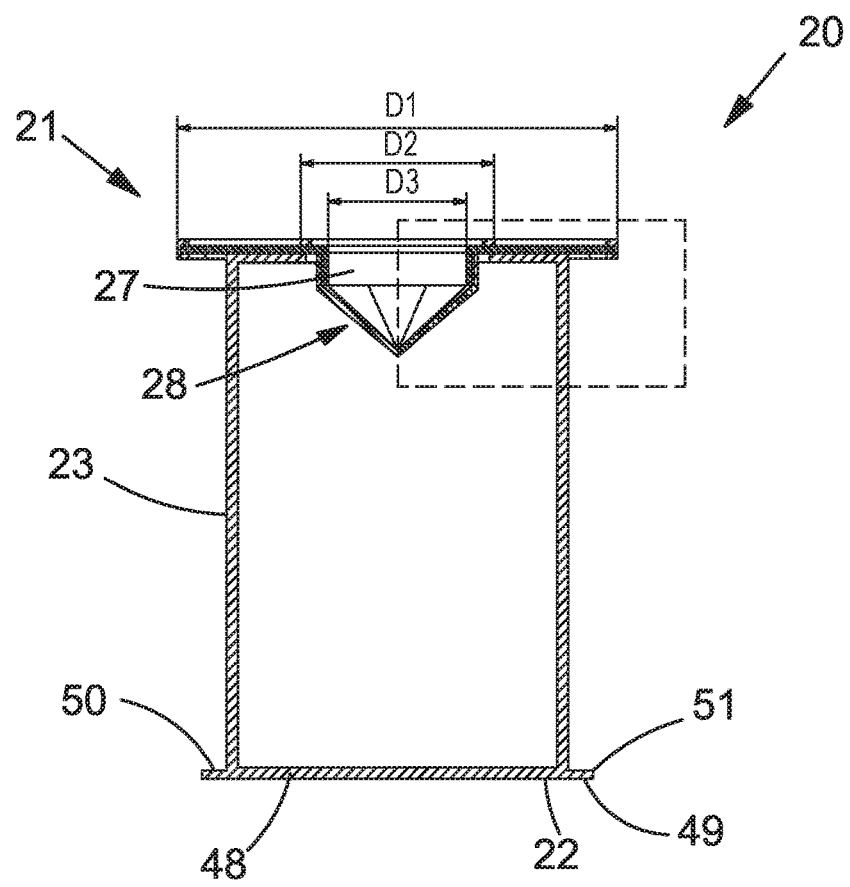
Figure 2C:
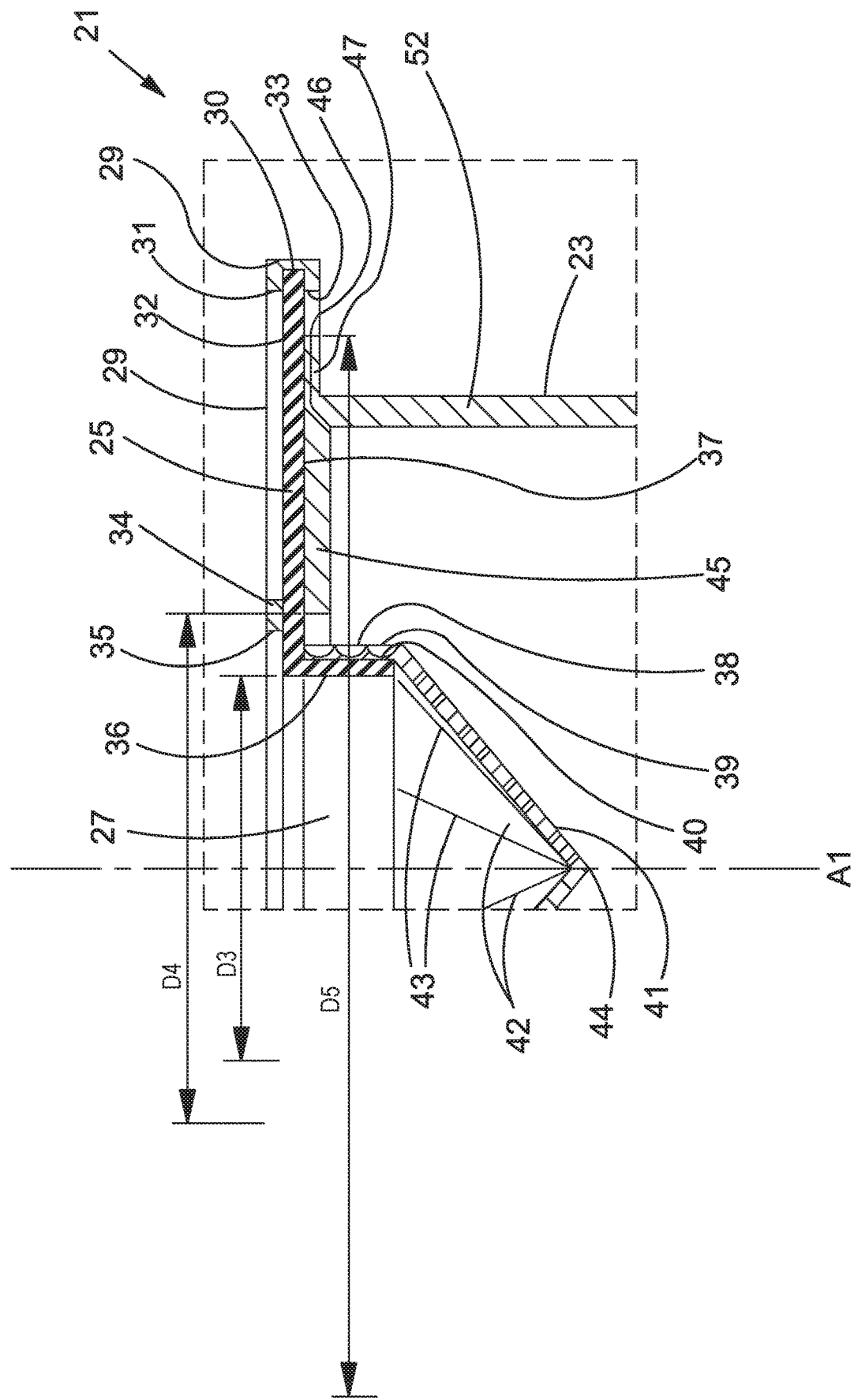
FIG. 2c is a side on cross sectional detail view from Detail B of FIG. 2b

FIG. 2b shows a section side section view A-A of the filter cartridge 20. As mentioned above, the main body 23 of the filter cartridge 20 is made from a filter material. The filter material is structured to allow air to pass through, but to prevent the passing of dust and small particles collected during vacuum cleaning.

The lower end portion 22 comprises a disc shaped base section 48 which closes the cylindrical body portion 23 of the filter cartridge 20. The base section The body portion 23 has an annular flared shoulder region 51 which is fixed to a rim 49 of the base section 48 by way of a seam 50, shown in FIG. 2b. In this way the filter material forms a complete enclosure for the collection of detritus which enters through the one-way conical valve.

Figure 3A:
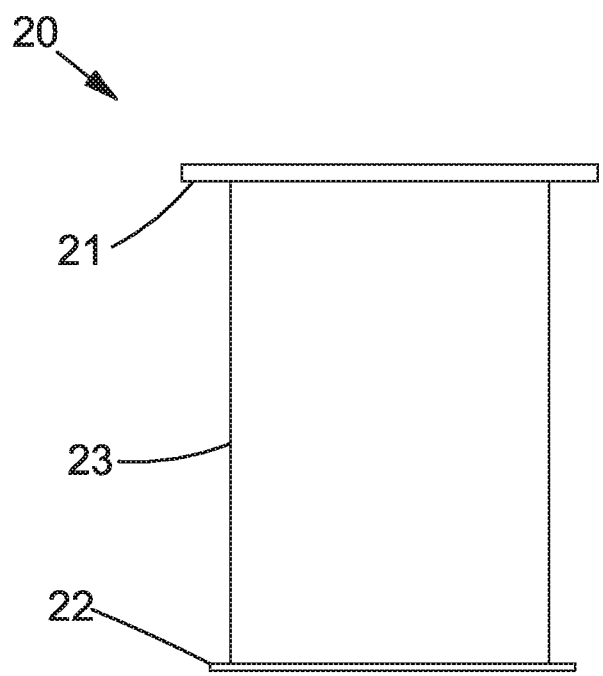
FIG. 3a is a schematic side view showing the filter cartridge in accordance with the present invention in an expanded, working configuration
Figure 3B:
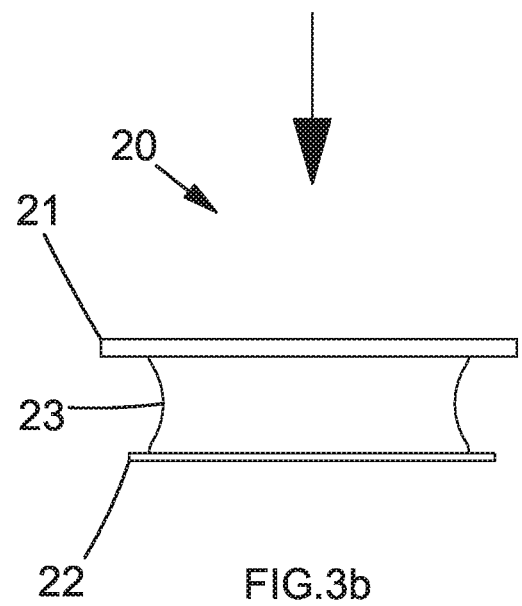
FIG. 3b is a side view showing the filter cartridge in its second configuration after being collapsed by pushing the first end portion towards the second end portion.
Figure 3C:
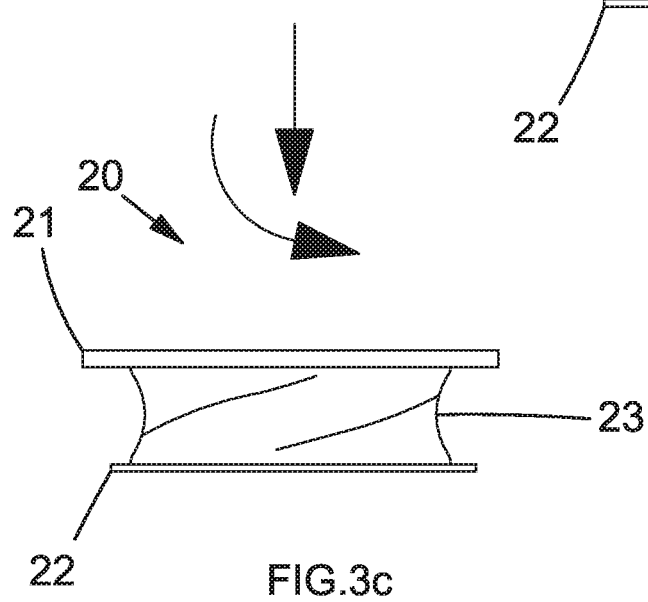
FIG. 3c is a side view showing variants of the filter cartridge in its collapsed, second configuration after being collapsed by pushing the first end portion towards the second end portion whilst twisting the first end portion axially.

In its first configuration, shown in FIG. 3a, the filter cartridge 20 is self-supported against buckling by the cylindrical shape and structure of the filter cartridge main body 23. The filter material 52 of the main body 23 may comprise a number of seams which join the filter material together, as will be described in more detail below. The filter may be collapsed by pushing down on the upper end 21 (per FIG. 3b) or by twisting the upper end relative to the lower end 22 as per FIG. 3c.

Figure 5A:
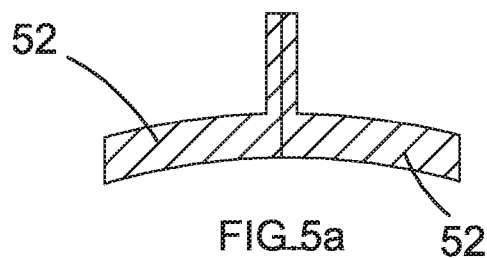
FIGS. 5a to 5d are side views showing various filter membrane material seam joining methods for use in manufacturing the present invention.
Figure 5B:
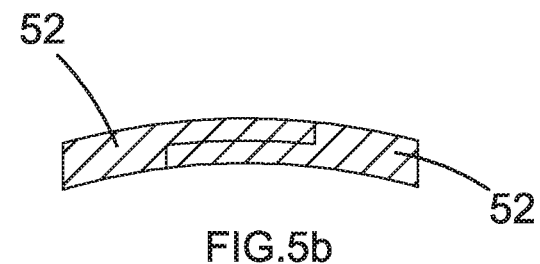
Figure 5C:
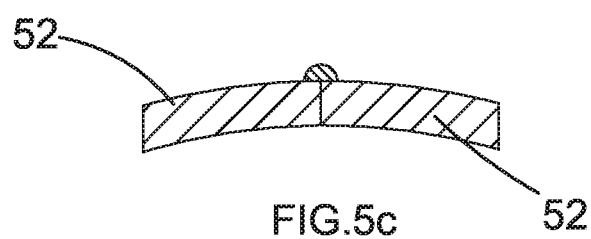
Figure 5D:
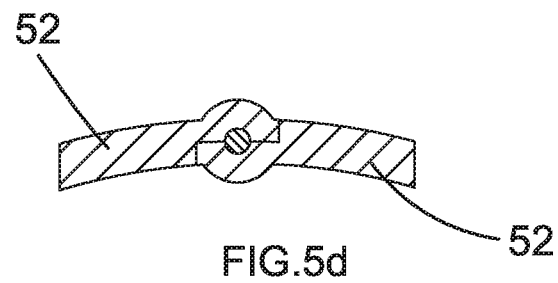

FIGS. 5a to 5d show some of the options available for assembling the filter by joining the filter material. These comprise ultrasonic welding of abutting faces (FIG. 5a), ultrasonic welding of overlapping faces (FIG. 5b), adhesion of abutting edges using a bead of hot melt adhesive (FIG. 5c) and incorporation of elongate resilient reinforcement members in joined seams (FIG. 5d). The reinforcement members may comprise rods or ribbon struts, typically formed of metal or relatively rigid, but resiliently flexible, plastics material. These provide structural support for the cartridge, but also permit collapse of the cartridges under an applied axial or twisting pressure.

Figure 6A:
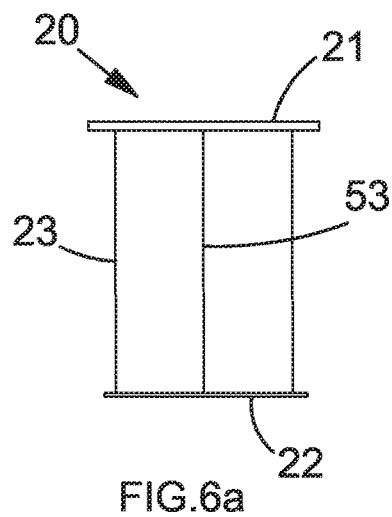
FIGS. 6a to 6e are side views showing various filter membrane seam configurations and dispositions for use in making cartridges in accordance with the present invention.
Figure 6B:
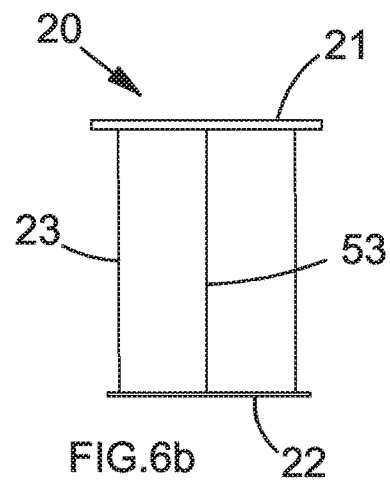
Figure 6C:
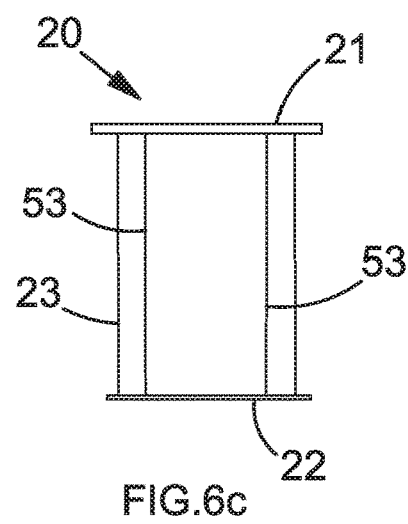
Figure 6D:
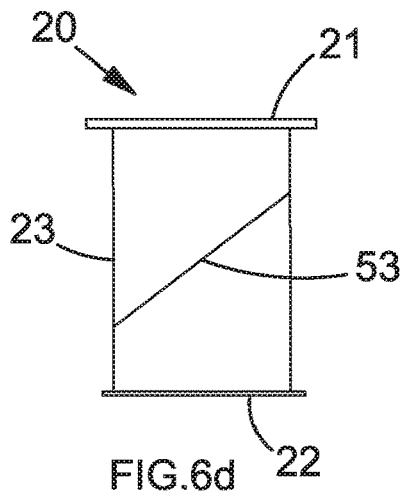
Figure 6E:
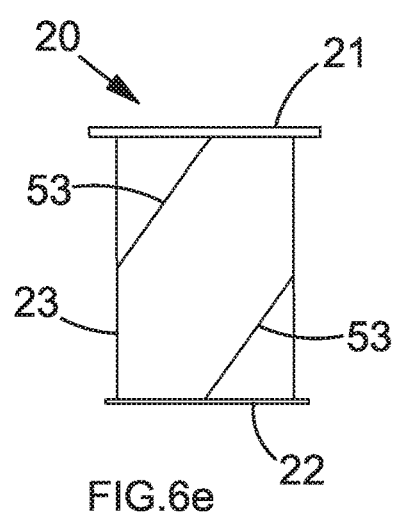

The seams may themselves provide structural support. FIG. 6a shows a single elongate longitudinally oriented seam, FIG. 6b has two diametrically opposed elongate longitudinally extending seams, FIG. 6c has three such seams, FIG. 6d has a single helically extending seam, and FIG. 6e has two parallel helically extending seams. Where seams overlap, or are welded/adhered or form local abutments, the stiffness of the structure is enhanced, while still permitting collapse of the filter for storage, or when on sale in packets.

Figure 7A:
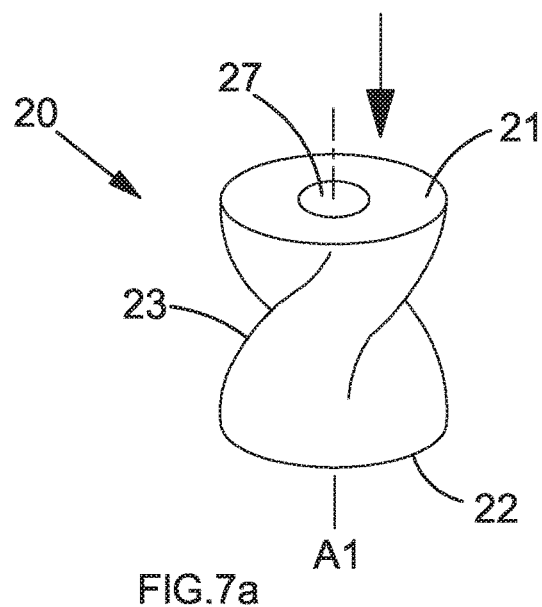
FIGS. 7a to 7e are side perspective view showing various structures and methods for collapsing the filter cartridge, in which the configuration of the expanded cartridges is shown in dashed lines.
Figure 7B:
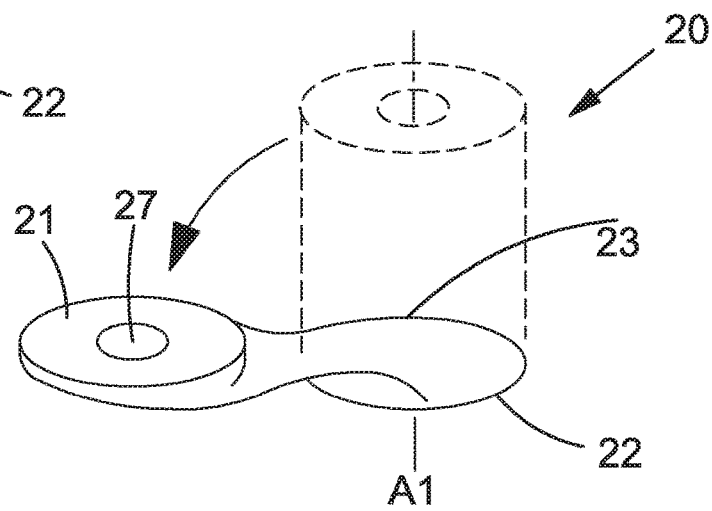
Figure 7C:
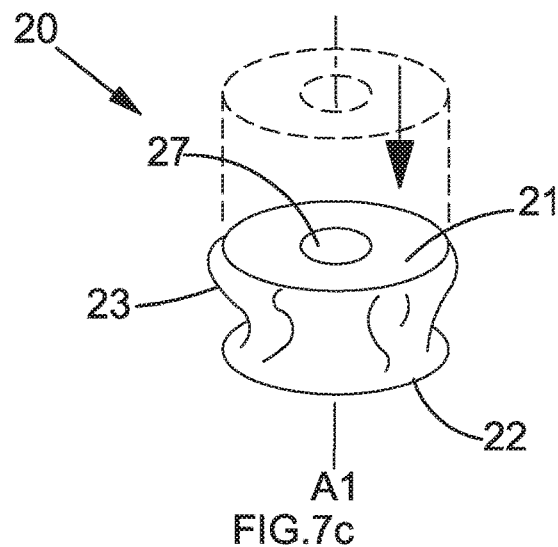
Figure 7D:
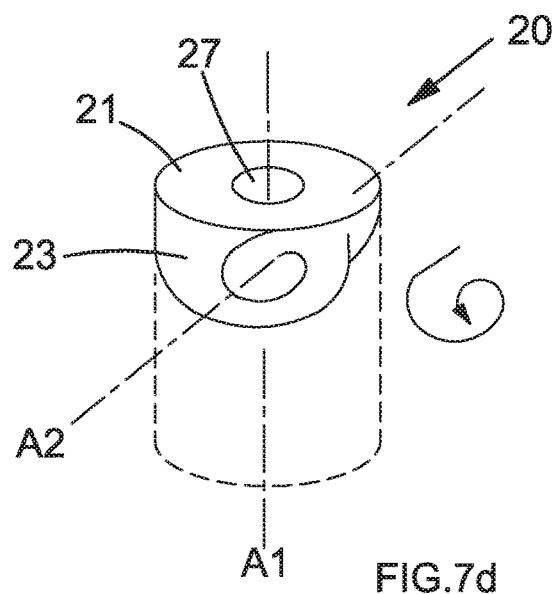

FIGS. 7a to 7e are side perspective view showing various structures and methods for collapsing the filter cartridge, in which the configuration of the expanded cartridges are shown in dashed lines. In FIG. 7a collapse is by axial pushing and twisting, in FIG. 7b the cartridge is folded until both end pieces are side-by-side, in FIG. 7c the cartridge upper end in simply pushed down in an axial direction (without twist), in FIG. 7d the lower portion of the cartridge is rolled-up, in FIG. 7e a single seam extends for just over two complete turns and may be collapsed simply by axial compression in the direction A1.

Figure 7E:
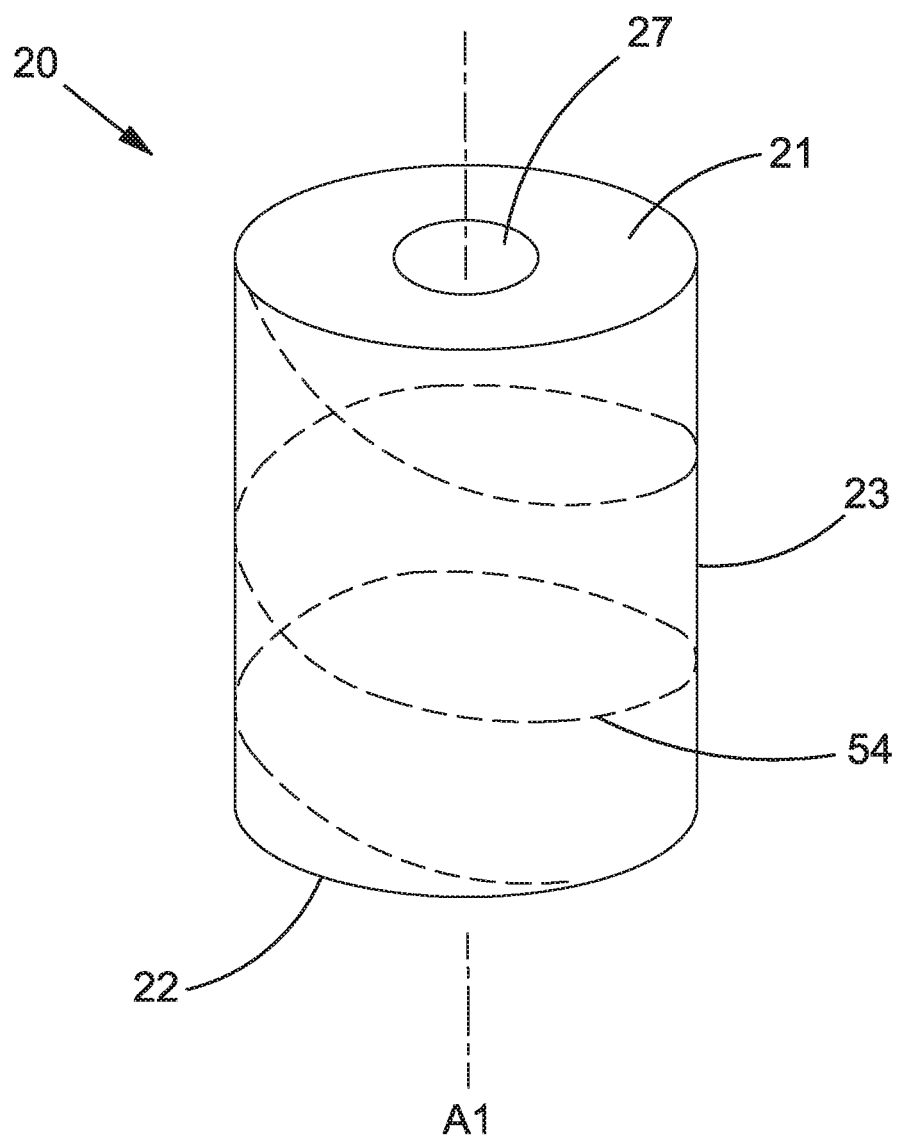

FIG. 7e shows a method for collapsing the filter cartridge wherein the first end portion 21 is pushed towards the second end portion 22 along the central axis A1 of the filter cartridge 20. In said filter cartridge, a double-coiled helical spring feature 54 is present in the filter cartridge main body 23 which travels from the first end 24 to the second end base section 48 within the structure of the filter material. Upon collapsing of the filter cartridge 20, the helical spring 54 is compressed as the first end portion 21 moves towards the second end portion 22 along the central axis A1 of the filter cartridge 20. In storage and packaging, the filter cartridge will be held in its second configuration, once the filter cartridge 20 is released from its second configuration, it will return naturally to its first, uncompressed configuration when the helical spring 54 decompresses.

Figure 8A:
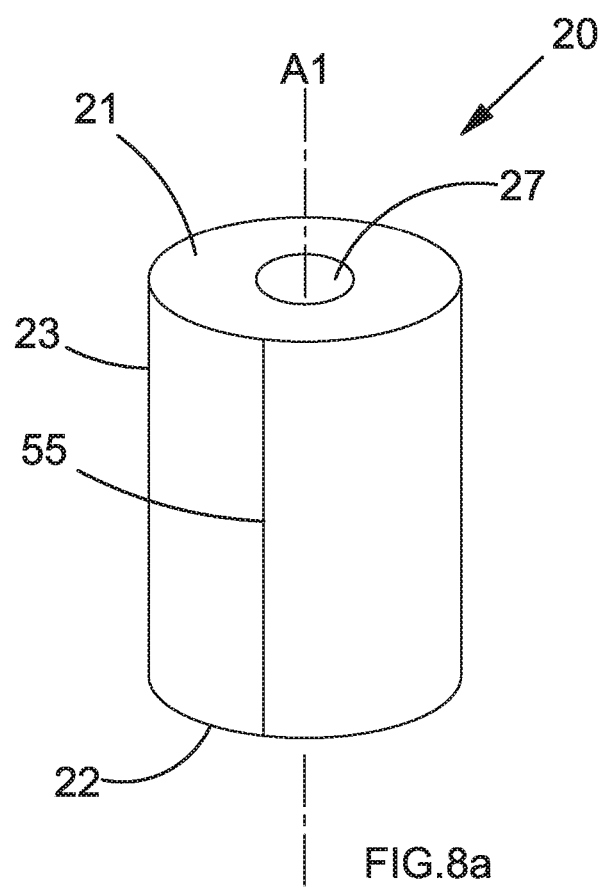
FIG. 8a is a side perspective view showing a filter cartridge in its expanded configuration, with a single longitudinal supporting strut incorporated into the seam as per FIG. 5d.
Figure 8B:
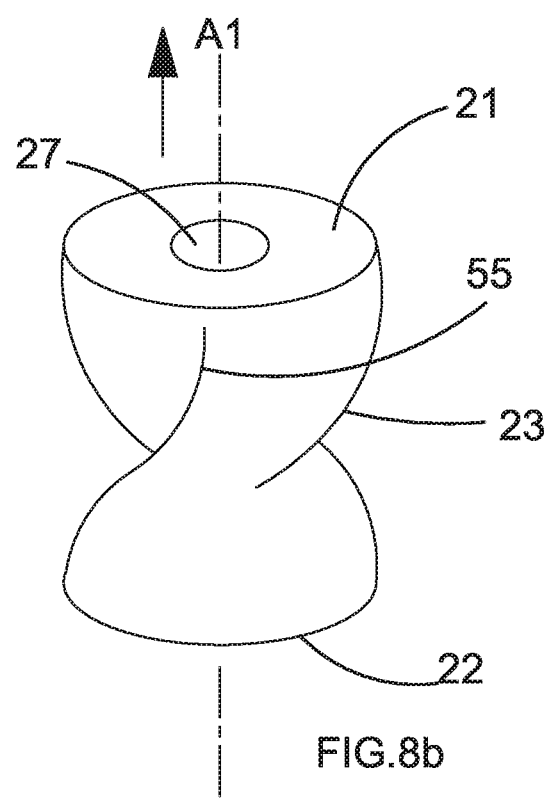
FIG. 8b is a side perspective view showing the filter cartridge of FIG. 8a axially twisted about A1 to adopt a partially collapsed configuration.

FIGS. 8a and 8b show a filter cartridge 20 in accordance with the present invention, which is collapsed when the first end portion 21 is pushed towards the second end portion 22 along the central axis A1 of the filter cartridge 20, whilst the first end portion 21 is rotated about the central axis A1 of the filter cartridge 20. Said filter cartridge is supported by one or more straight struts 55 which travel the length of the filter cartridge body portion 23 from the first end 24 to the second end base 48. The vertical struts 55 are fixed to the filter cartridge main body 23.

The normal arrangement of the vertical struts 55 is straight, as shown in FIG. 8a, however, when the aforementioned pushing and twisting motion is applied to the filter cartridge 20, the struts 55 deform in a corresponding manner to the filter cartridge main body 23, as shown in FIG. 8b, until the filter cartridge reaches its second configuration. Once the filter cartridge 20 is released from its second configuration, it will return naturally to its first, uncompressed configuration when the struts 55 return to their natural arrangements.

Figure 10A:
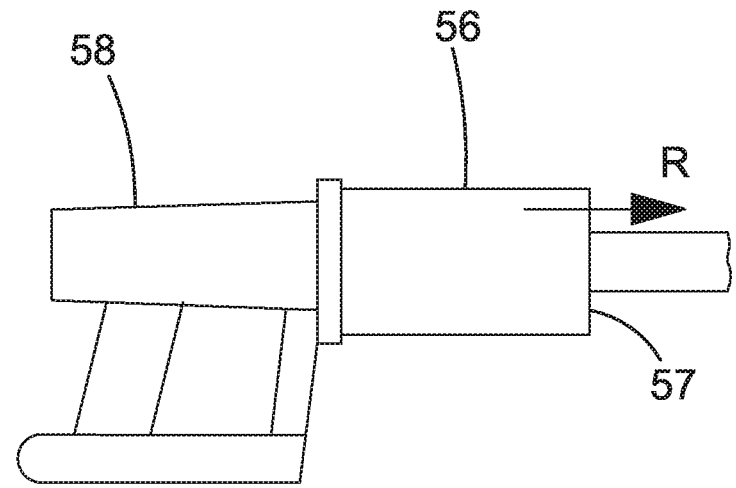
FIG. 10a is a schematic side view of the vacuum cleaner of the type shown in FIG. 9 in an initial closed configuration.
Figure 10B:
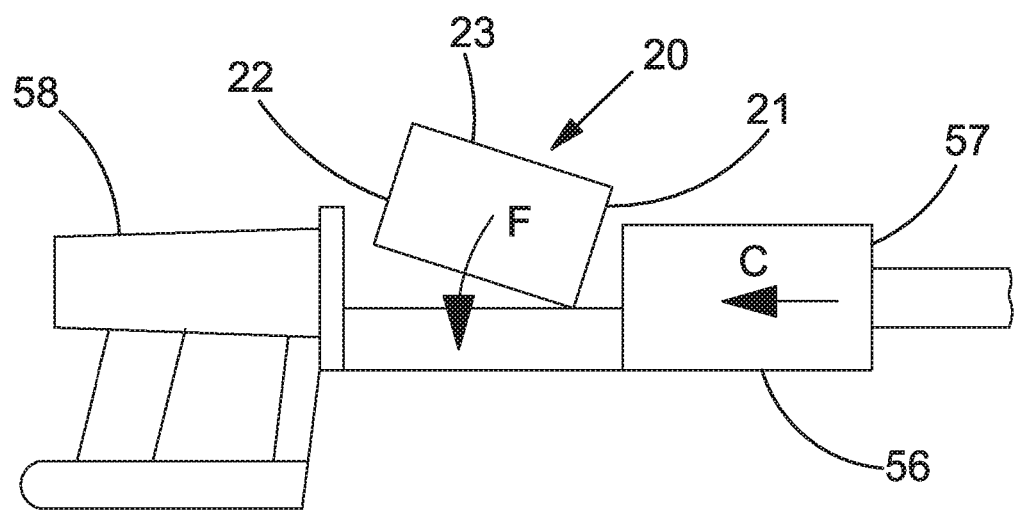
FIG. 10b is a schematic side view of the vacuum cleaner of FIG. 10a, with a vacuum chamber wall axially shifted to the top-loading, open configuration.

FIGS. 9, 10a and 10b show schematically a filter cartridge 20 in accordance with the present invention in its first (expanded) configuration being inserted into a hand held vacuum cleaner 58 such that the filter cartridge sits horizontally in the vacuum cleaner. The filter cartridge is placed into the vacuum cleaner (arrow F in FIG. 10b) such that the second end portion 22 of the filter cartridge 20 sits next to a suction air inlet 59 for a vacuum drive (not shown) of the cleaner. The vacuum cleaner comprises an open-ended chamber 56, which slides (arrow C in FIG. 10b) over the filter cartridge 20 to the until an interior face of the end cap 57 abuts against the inner seal 34 and outer seal 29 of the first end portion 21 of the filter cartridge 20. The filter cartridge may be removed without touching the cartridge by axially shifting the chamber housing (as shown by the arrow R in FIG. 10a), and then inverting the vacuum cleaner so that the cartridge falls away. This is useful when the collected dust may contaminated or hazardous.

When the vacuum cleaner is used, air is sucked into the filter cartridge 20 through the nozzle 65, which feeds into the central opening 27 of the filter cartridge by the suction motor behind the suction inlet 59. Air is drawn through the filter material of the body 23 and the second end portion 22. The filter body portion has a length which is less than the interior length of the vacuum chamber 56, and a diameter that is less than that of the chamber 65. This ensures a separation between the suction inlet orifice 59 and the filter end portion 22, and ensures that a lower pressure plenum is formed around the cartridge, in the annular space between filter body and chamber housing, when the suction motor is active.

Figure 11A:
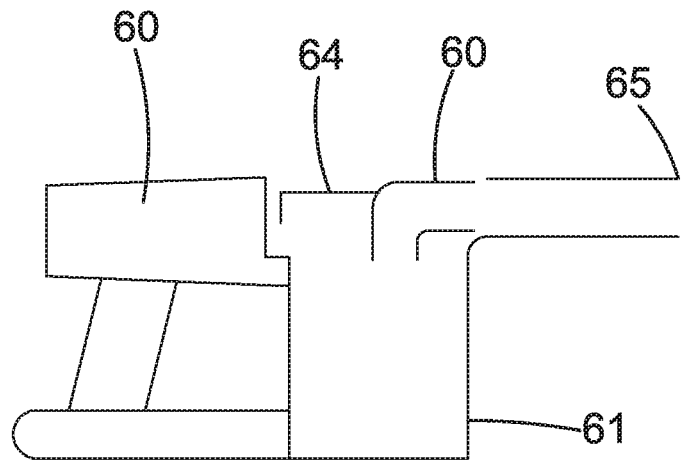
FIG. 11a shows an alternative vacuum cleaner arrangement in which a vacuum chamber is oriented to stand vertically, and with a chamber lid lifted-up in FIG. 11b.
Figure 11B:
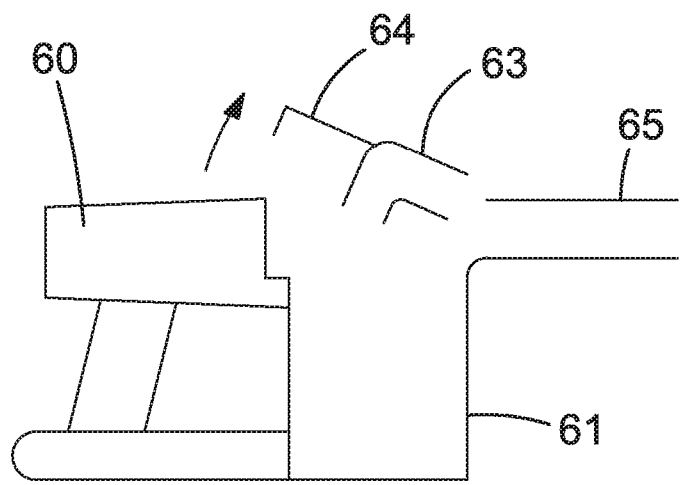
FIG. 11c is another side view of the vacuum cleaner with the filter cartridge of the invention standing vertically in the vacuum chamber.
Figure 11C:
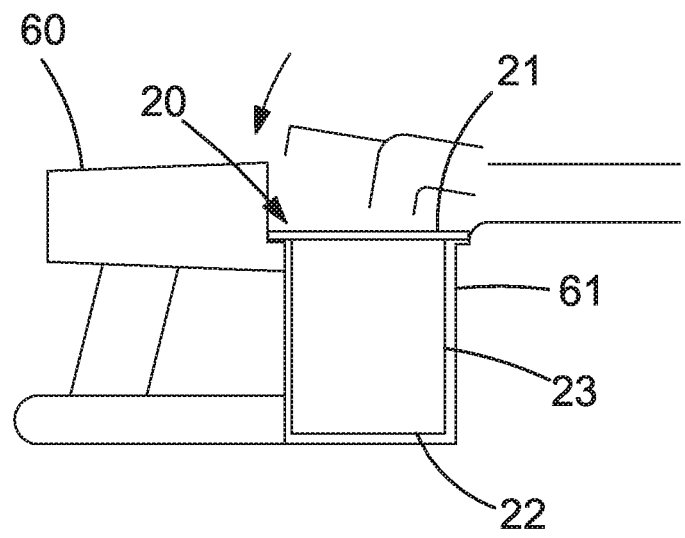

FIGS. 11a to 11c show schematically an alternative arrangement of a handheld vacuum cleaner 60 in which the filter cartridge 20 in accordance with the present invention sits in a vertical orientation in a vacuum chamber 61. The chamber is fed by an elbow inlet pipe 63 in a lid 64 of the chamber. This inlet pipe is fed by the nozzle tube 65. The lid may be opened (arrow in FIG. 11a) to permit removal of the filter cartridge by manual vertical extraction, or by inverting the vacuum cleaner so that the cartridge drops out hands free.

SECOND EMBODIMENT

Figure 12:
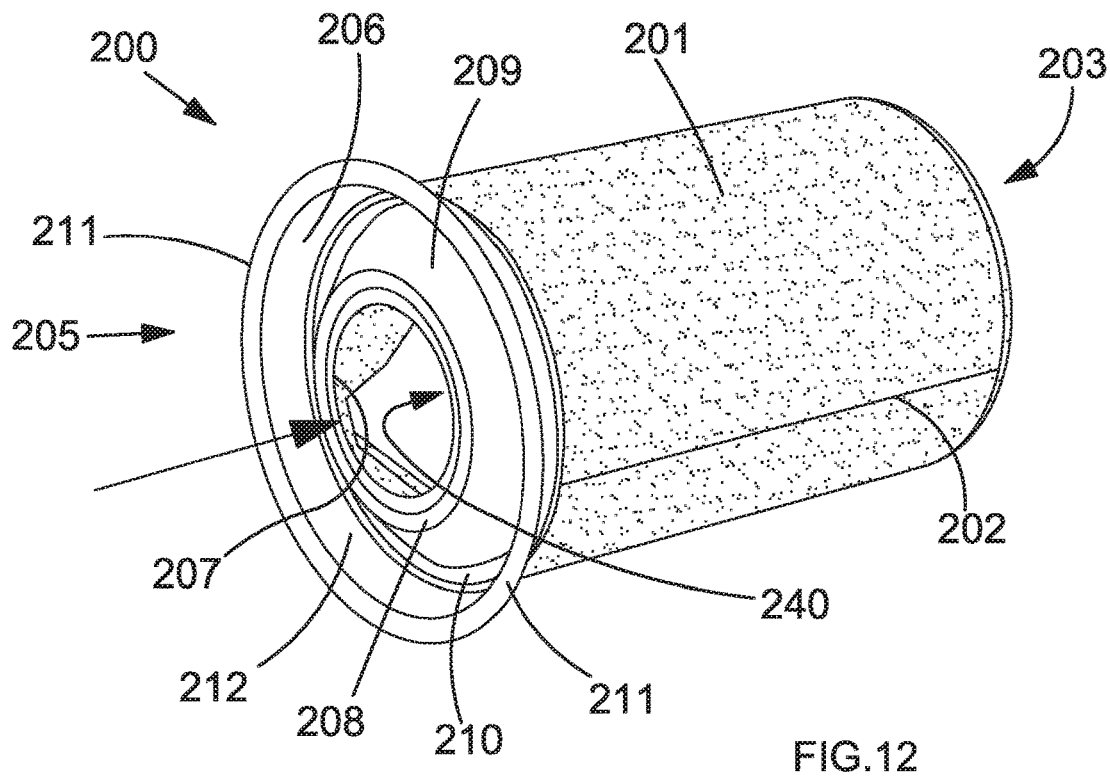
FIG. 12 is a perspective view of a filter cartridge in accordance with a second embodiment of the invention.

A filter cartridge in accordance with a second embodiment of the invention is shown generally as 200 in FIG. 12. The cartridge has a cylindrical body portion 201 formed of a filter membrane material suitable for vacuum cleaner use. The body portion has an elongate welded seam 202 extending in an axial direction. A distal end 203 of the cartridge (best seen in FIG. 15) comprises a flat disc of the filter membrane material, with a welded annular seam 204 formed by overlapping portions of the body portion distal edge and the outer region of the flat disc. A proximal end 205 of the filter cartridge is formed with as a unitary, generally annular support member 206 which is a moulding of plastics material. The support includes an inner frusto-conical portion 209 which tapers inwardly from an outer base region 210 to a central collar 207 around an inlet orifice 240. A rim 208 is provided around the collar, which serves as a sealing bead when the cartridge is placed inside a vacuum cleaner. From the outer base region 210 the support includes a portion 212 which flares outwardly to an annular outer flange feature 211.

Figure 13:
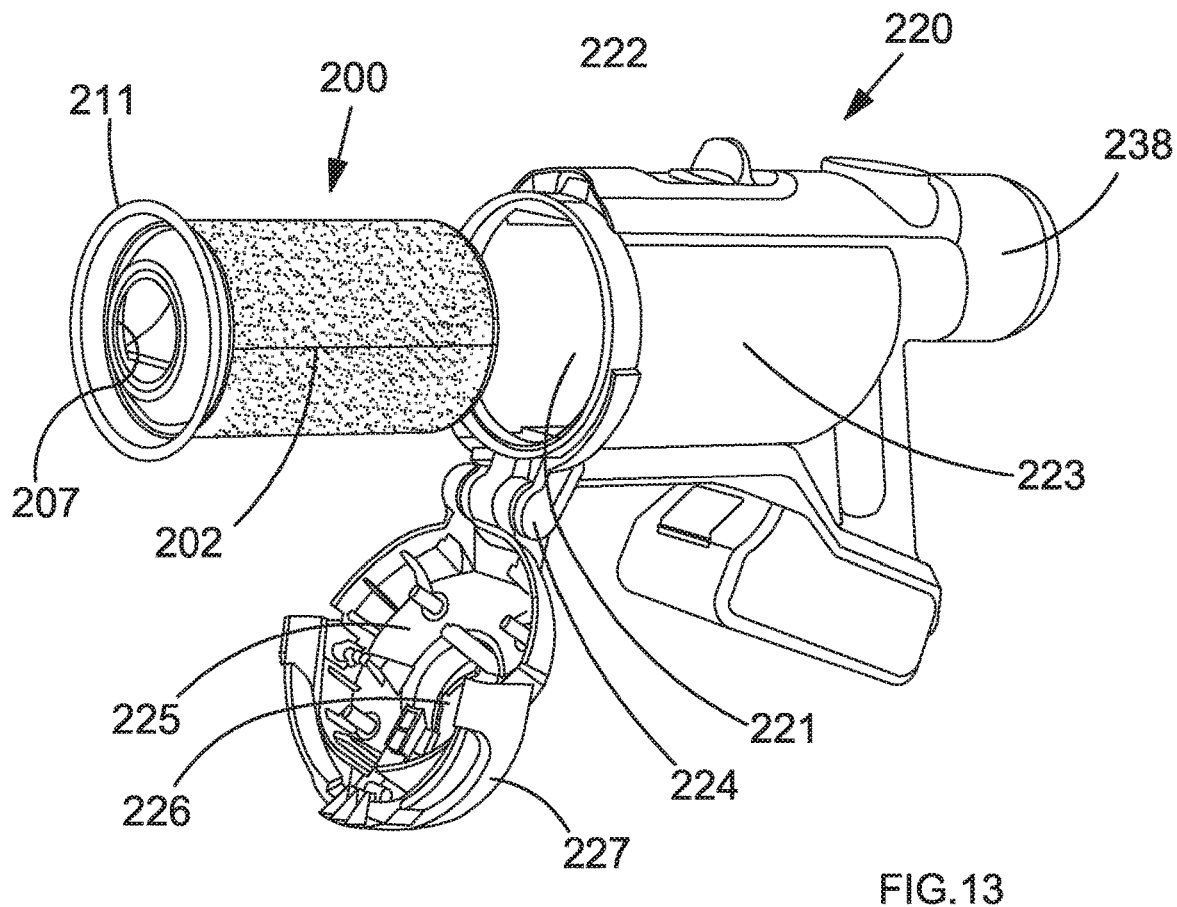
FIG. 13 is perspective view of a handheld vacuum cleaner with a lid open and the filter cartridge of the second embodiment oriented for entry into a vacuum chamber.

In FIG. 13 the filter cartridge is shown before loading into a handheld vacuum cleaner 220. The vacuum cleaner has a vacuum chamber 221 of generally cylindrical shape defined by a generally cylindrical housing 223. The chamber has a proximal end provided with a collar 222. A lower region of the collar is provided with a hinge 224 by which a lid member 225 is attached to the housing 223. The lid member has a circular, dished configuration and a central inlet orifice 226. An outer region of the lid member is provided with an inset semi-circular clamping member 227. When the filter cartridge is inserted into the chamber 221, the annular flange feature 211 abuts the collar 222, with the support 206 nested in the chamber, set back from the flange feature. The lid member is then closed by pivoting around the hinge 224. The outer edge of the lid member is held tightly against the flange feature 211 as the clamping member 227 is fastened to a retaining latch (not shown) on the upper edge of the collar 222. This holds the cartridge in position and ensure an air-tight seal is maintained between the support 206, collar 222 and lid member 225. The central inlet orifice 226 of the lid member will receive one end of an elongate tubular nozzle (not shown), which (during use) will transport air-entrained detritus into the interior of the cartridge via the collar 207, induced by a suction drive 228 provided at a distal end of the vacuum cleaner.

Figure 14A:
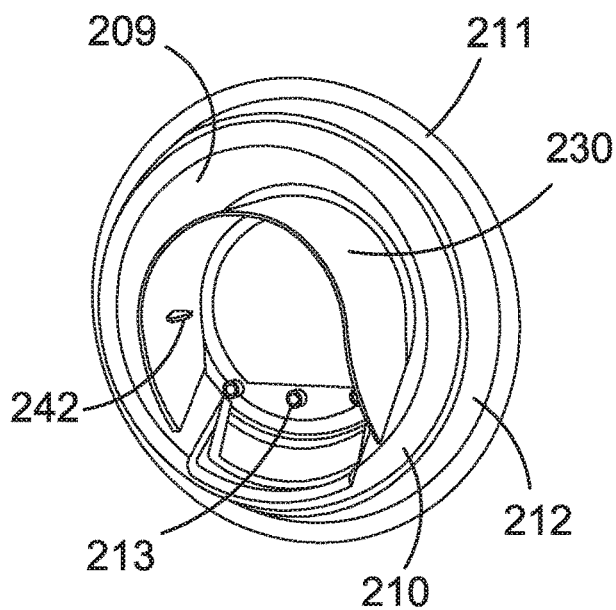
FIG. 14a is a perspective view of a support structure for this filter cartridge, with a non-return valve in a closed position.
Figure 14B:
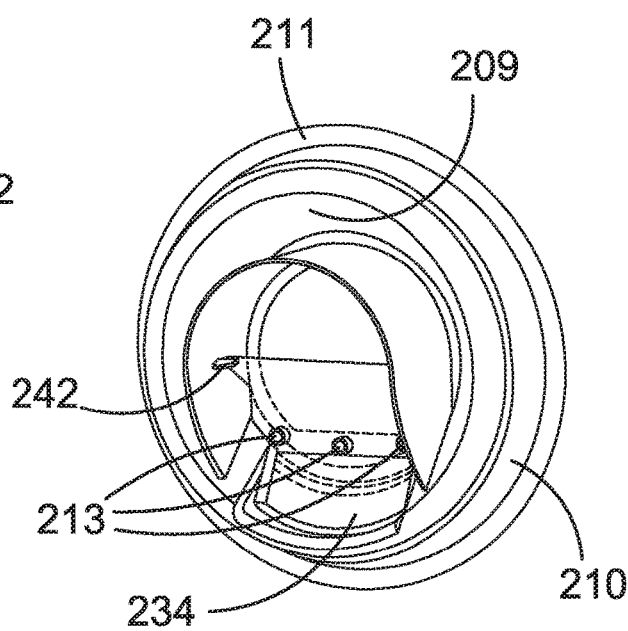
FIG. 14b is a similar view with the non-return valve in an open position.
Figure 14C:
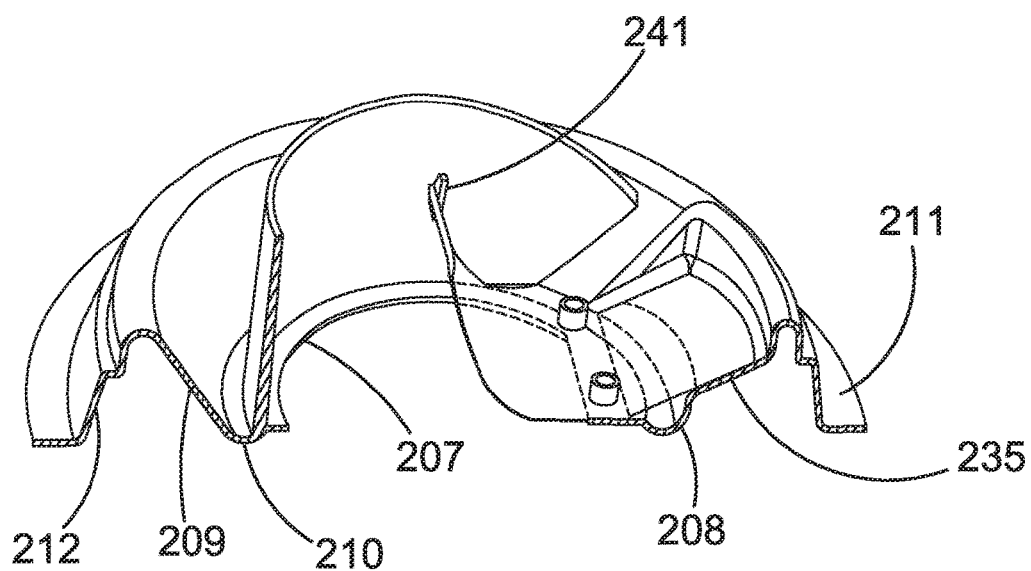
FIG. 14c is a sectioned perspective view of the support structure with a flap member in a deflected position.
Figure 15:
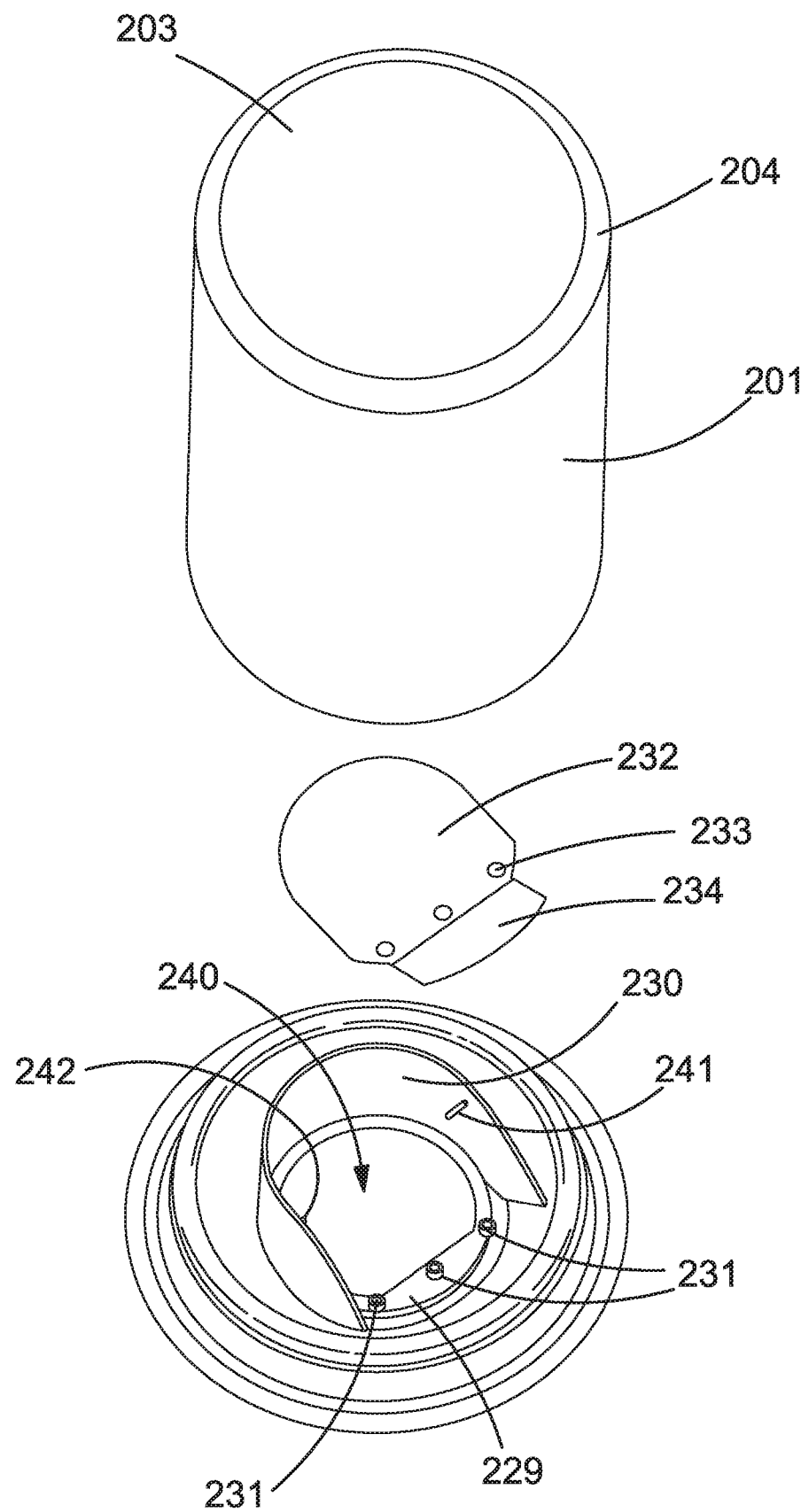
FIG. 15 is an exploded perspective view of the filter cartridge of the second embodiment.

In FIGS. 14a and 14b the distal side of the support member 206 is shown. A sectioned support member is shown in FIG. 14c. In FIG. 14 a shroud member 230 having a generally horse-shoe shape is shown surrounding the central collar 207 of the support. A chord feature 229 of the collar 207 is best seen in FIG. 15. The chord feature provided a flat edge region to the collar inner edge. Three spaced apart studs 231 are provided along the chord feature. A transparent planar flap member 232 is has the shape shown in FIG. 15 which corresponds to the inner shape of the collar 227. Three spaced apart bores 233 are provided along one edge region of the flap member. Projecting out from the said one edge region is a tongue feature 234. The flap member is placed over the three studs 213 with the bores receiving the studs. The studs are then heat pressed to fix the flap member in place. The tongue feature sits in a complementary shaped inset wedge 235. The flap member acts as a cantilever closure which, at rest, obturates the inlet orifice 240. When a vacuum suction is applied to the vacuum chamber 224, the airflow into the filter cartridge through the orifice 240 causes the flap member to bend inwards, as shown in FIGS. 14b and 14c. Two radially directed nubs 241, 242 are provided diametrically opposed to one another on the inside of the shroud 230. These nubs serve as stops to the inward deflection of the flap member. Once the suction is removed, the flap member returns to the rest position. The shroud serves to help prevent egress of detritus in the filter cartridge interior via the inlet orifice by blocking radial travel of particles towards the collar, especially when the cartridge interior is almost full.

Figure 16:
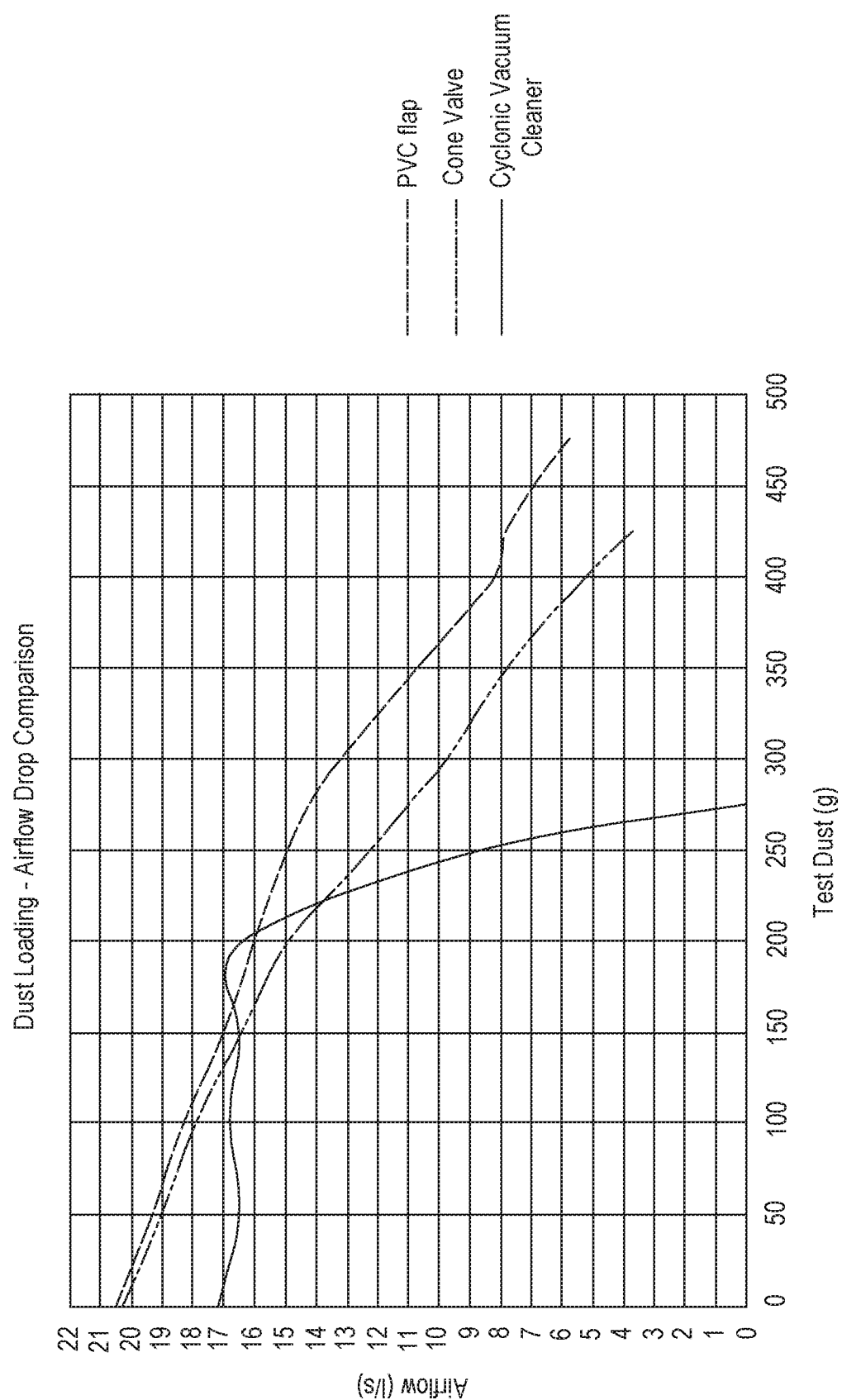
FIG. 16 is a graph showing airflow through various filters (prior art cyclonic and two filter cartridges in accordance with the invention) as a function of dust loading.

The test results shown if the graph FIG. 16 demonstrate that the filter cartridge of the second embodiment which uses a flap member (labelled PVC flap) is capable of being filled with a greater loading of dust (about 475 g) than the filter cartridge of the first embodiment (420 g) which has a conical valve. Both of these embodiments of the invention achieve higher dust loads than a comparable handheld cyclonic vacuum cleaner with a correspondingly-dimensioned vacuum chamber, but without a filter cartridge or collection bag in the chamber. The filter cartridge with a flap member valve permits greater flow rates and a higher dust loading than the cartridge with the conical valve. However both of these perform better than the cyclonic cleaner, which has a performance which falls off steeply after a dust loading of 200 g.

To summarise the present invention relates to a filter cartridge for a vacuum cleaner comprising first and second opposite end walls, a side wall or walls which extend between the end walls so as to define an enclosure which surrounds a filter interior, wherein one or more of the walls comprises filter membrane material, the cartridge having an opening provided through the first end wall for receiving air-entrained detritus into the interior, the opening being defined by a rigid support structure which spans and supports the first end wall of the cartridge. The cartridge typically includes a non-return valve which closes when suction is removed so as to help prevent collected detritus escaping from the filter cartridge interior. The valve may comprise a conical valve with flexible facets, or a cantilevered flap.

FIG. 12

The invention claimed is:

1. A filter cartridge for a vacuum cleaner comprising first and second opposite end walls, a side wall or walls which extend between the end walls so as to define an enclosure which surrounds a filter interior, wherein one or more of the walls comprises filter membrane material, the cartridge having an opening provided through a first end wall for receiving air entrained detritus into the interior, the opening being defined by a rigid support structure which spans and supports the first end wall of the cartridge, wherein structural reinforcement of one or more of the side wall or walls, and/or second end wall, is provided so that the enclosure is self-supporting but collapsible, so that the cartridge may adopt an erect use configuration, and in a collapsed configuration the side wall or walls and second end are drawn together onto the rigid support structure of the first end so as to be flat-packed.

2. A filter cartridge as claimed in claim 1, wherein the structural reinforcement acts to bias the cartridge into the erect configuration, so that a collapsed cartridge will spontaneously adopt the erect configuration when a collapsing constraint is released.

3. A filter cartridge as claimed in claim 1, wherein the structural reinforcement comprises one or more elongate seams joining portions of filter membrane material.

4. A filter cartridge as claimed in claim 3, wherein one or more of the elongate seams extends in the side wall in an axial direction between end walls.

5. A filter cartridge as claimed in claim 3, wherein the one or more elongate seams extend helically around and along the side wall between end walls.

6. A filter cartridge as claimed in claim 3, wherein the seam comprises overlapped, or pinched together, or butted together portions of filter membrane material and wherein the portions of filter membrane material are joined by welding.

7. A filter cartridge as claimed in claim 1, wherein the structural reinforcement comprises one or more resiliently flexible elongate struts, which struts when elastically deformed during collapse provide the bias.

8. A filter cartridge as claimed in claim 7, wherein the one or more struts is integrated into one or more seam.

9. A filter cartridge as claimed in claim 7, wherein the one or more struts is attached to the filter membrane material of the side wall.

10. A filter cartridge as claimed in claim 1, wherein the rigid support structure is generally disc shaped and provided with a circumferential outer annular seal configured to be operative between an outer edge of the cartridge and an internal wall of a cylindrical vacuum chamber in which the filter cartridge is accommodated when in use.

11. A filter cartridge as claimed in claim 1, wherein the filter membrane material provides the side wall or walls of the cartridge and the second end wall of the cartridge, wherein the filter cartridge has a generally cylindrical configuration, with the first and second end walls having a generally disc-shaped configuration, and the side wall or walls is cylindrical extending between the ends, and wherein the rigid support structure of the first end wall comprises a central inner collar which defines the opening and an annular outer rim of the support structure defines a perimeter of the first end wall, wherein the central inner collar and the annular outer rim are structurally attached to each other as a unitary member.

* * * * *